United States Patent
Kim

(10) Patent No.: US 11,874,129 B2
(45) Date of Patent: Jan. 16, 2024

(54) APPARATUS AND METHOD FOR SERVICING PERSONALIZED INFORMATION BASED ON USER INTEREST

(71) Applicants: HYUNDAI MOTOR COMPANY, Seoul (KR); KIA MOTORS CORPORATION, Seoul (KR)

(72) Inventor: Chi Hwan Kim, Seongnam-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 569 days.

(21) Appl. No.: 16/454,603

(22) Filed: Jun. 27, 2019

(65) Prior Publication Data
US 2020/0191596 A1 Jun. 18, 2020

(30) Foreign Application Priority Data

Dec. 12, 2018 (KR) .................. 10-2018-0159725

(51) Int. Cl.
*G01C 21/36* (2006.01)
*G06F 16/9535* (2019.01)
*G06V 20/59* (2022.01)

(52) U.S. Cl.
CPC ..... *G01C 21/3641* (2013.01); *G01C 21/3679* (2013.01); *G06F 16/9535* (2019.01); *G06V 20/597* (2022.01)

(58) Field of Classification Search
CPC ............ G01C 21/3641; G01C 21/3679; G01C 21/3423; G01C 21/3492; G01C 21/3617;
(Continued)

(56) References Cited

U.S. PATENT DOCUMENTS 10,189,481 B2  1/2019  Ahn
2013/0345961 A1* 12/2013  Leader ............... G01C 21/3617
                                                701/410
(Continued)

FOREIGN PATENT DOCUMENTS

JP        2010218376 A    9/2010
KR     20150050836 A    5/2015
(Continued)

OTHER PUBLICATIONS

Office Action cited in correspondingKorean application No. 10-2018-0159725; dated Sep. 24, 2023; 14 pp.

*Primary Examiner* — Robert T Nguyen
*Assistant Examiner* — Dylan Brandon Mooney
(74) *Attorney, Agent, or Firm* — Lempia Summerfield Katz LLC

(57) ABSTRACT

An apparatus for servicing personalized information based on user interest includes: a communication device that performs communication with a vehicle terminal of a vehicle; storage that stores context information for respective fields of interest of users; and a processor that extracts a field of interest of the user of the vehicle based on similarity obtained by matching context information received from the vehicle terminal at time of interest and the stored context information for the respective fields of interest. In particular, the processor provides a cluster of similar interest information to the vehicle terminal, based on the extracted field of interest.

12 Claims, 4 Drawing Sheets

(58) Field of Classification Search
CPC ...... G01C 21/3439; G01C 21/3605; G01C 21/34; G01C 21/3484; G01C 21/3476; G06F 16/9535; G06F 16/9537; G06F 18/256; G06K 9/00845; G06V 20/597; G06V 20/62; G06Q 30/0266; G06Q 30/0202; G06Q 50/10; G06N 3/065; G06N 3/08

See application file for complete search history.

(56) References Cited

U.S. PATENT DOCUMENTS

| | | | |
|---|---|---|---|
| 2014/0278086 A1* | 9/2014 | San Filippo | G01C 21/3492 701/527 |
| 2015/0006278 A1* | 1/2015 | Di Censo | G06Q 30/0244 705/14.43 |
| 2016/0180392 A1* | 6/2016 | Liu | G06Q 30/0267 705/14.53 |
| 2016/0239554 A1* | 8/2016 | Hosein | G06F 16/951 |
| 2017/0048349 A1 | 2/2017 | Ahn | |
| 2017/0193533 A1 | 7/2017 | Lai et al. | |
| 2018/0058875 A1* | 3/2018 | Wan | G01C 21/3641 |
| 2018/0293303 A1* | 10/2018 | Singh | G06F 16/3325 |
| 2019/0027046 A1* | 1/2019 | Orduna | G06Q 50/30 |
| 2019/0171943 A1* | 6/2019 | Pao | G06F 16/29 |
| 2019/0340817 A1* | 11/2019 | Bostick | G06F 3/04815 |
| 2021/0182558 A1* | 6/2021 | Kim | G06Q 30/0627 |

FOREIGN PATENT DOCUMENTS

| | | |
|---|---|---|
| KR | 10-2015-0063198 A | 6/2015 |
| KR | 10-1619537 B1 | 5/2016 |
| KR | 10-1683524 B1 | 12/2016 |
| KR | 10-2017-0105336 A | 9/2017 |

\* cited by examiner

APPARATUS AND METHOD FOR SERVICING PERSONALIZED INFORMATION BASED ON USER INTEREST

CROSS-REFERENCE TO RELATED APPLICATION

This application claims priority to and the benefit of Korean Patent Application No. 10-2018-0159725, filed on Dec. 12, 2018, the entire contents of which are incorporated herein by reference.

FIELD

The present disclosure relates to an apparatus and method for providing personalized information based on user interest.

BACKGROUND

The statements in this section merely provide background information related to the present disclosure and may not constitute prior art.

In recent years, with the wide use of smart devices, the number of users of social network services (SNS) has been significantly increased due to ease of use of the Internet. In the SNS, a personal interest can be easily exposed through a text message (e.g., texting and posting a personal opinion), an image, a video, and the like. Accordingly, various research have been conducted to provide a user with personalized information by determining individual users' tendency or interest based on information that can be obtained from the SNS.

SUMMARY

An aspect of the present disclosure provides an apparatus and method for identifying time of interest that a user has an interest in a specific object, based on information regarding user operation of a vehicle during travel of the vehicle and generating and providing interest information at the identified time of interest, based on context information relating to the specific object.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for servicing personalized information based on user interest includes: a communication device that performs communication with a vehicle terminal of a vehicle, storage that stores context information for respective fields of interest of users, and a processor that extracts a field of interest of a user of the vehicle based on a similarity obtained by matching context information received from the vehicle terminal at a time of interest and the stored context information for the respective fields of interest, and provides a cluster of similar interest information to the vehicle terminal, based on the extracted field of interest.

The vehicle terminal may determine whether a current time corresponds to the time of interest, based on user operation information of the vehicle during travel of the vehicle.

The user operation information of the vehicle may include at least one of a window operation, departure information of the vehicle from a lane, acceleration or deceleration information of the vehicle, volume adjustment information of a media device in the vehicle, or engine stop information of the vehicle.

The vehicle terminal may assign a weight value to each context information, based on gaze information of the user and the user operation information of the vehicle, and the vehicle terminal may evaluate an interest level of the user for the context information, based on the total sum of the weight values of the context information.

The vehicle terminal may group the received context information together, based on the interest level of the user.

The received context information may be defined as information for extracting the user's field of interest.

The received context information may include at least one of media playback information, vehicle position information, a point of interest, video information, road information, a search term, time information, and a travel direction.

According to another aspect of the present disclosure, a method for servicing personalized information based on user interest includes steps of: receiving, by a processor, context information at a time of interest from a vehicle terminal; extracting, by the processor, a field of interest of a user of a vehicle based on a similarity obtained by matching the received context information and previously stored context information for respective fields of interest; and providing, by the processor, a cluster of similar interest information to the vehicle terminal, based on the extracted field of interest.

The step of receiving the context information may include steps of determining whether a current time corresponds to the time of interest based on user operation information of a vehicle during travel of the vehicle, collecting the context information at the time of interest by the vehicle terminal when it is determined that the current time corresponds to the time of interest; and transmitting the collected context information to an apparatus that services personalized information based on user interest, by the vehicle terminal.

The step of determining whether the current time corresponds to the time of interest includes: determining whether an object of interest is present, based on the user operation information of the vehicle during the travel of the vehicle, and the object of interest is defined as an object to which the user of the vehicle shows an interest.

The user operation information includes at least one of window operation information of the vehicle, departure information of the vehicle from a lane, acceleration or deceleration of the vehicle, volume adjustment information of a media device in the vehicle, or engine stop information.

The step of collecting the context information may include: assigning, by the vehicle terminal, a weight value to each context information, based on gaze information of a user of the vehicle and the user operation information of the vehicle; and evaluating an interest level of the user for the collected context information, based on a total sum of the weight values of the collected context information.

The vehicle terminal may group the collected context information together, based on the interest level of the user.

The collected context information may be defined as information for extracting the user's field of interest.

The collected context information may include at least one of media playback information, vehicle position information, a point of interest, video information, road information, a search term, time information, and a travel direction.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
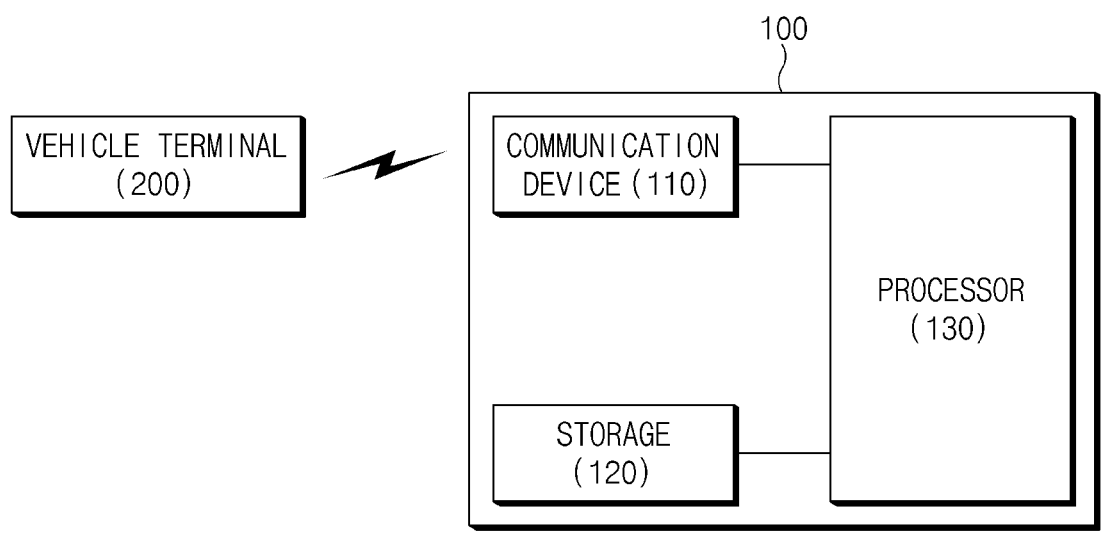
FIG. 1 is a block diagram illustrating a configuration of an apparatus for servicing personalized information based on user interest.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus 100 for servicing personalized information based on user interest according to an exemplary form of the present disclosure.

Referring to FIG. 1, the apparatus 100 for servicing personalized information based on user interest may be implemented in a server form and may be connected with a vehicle terminal 200 via a network. Here, the network may be implemented with a wireless internet network such as wireless LAN (WLAN) (e.g., WiFi), wireless broadband (Wibro), and/or world interoperability for microwave access (Wimax), a mobile communication network such as code division multiple access (CDMA), global system for mobile communication (GSM), long term evolution (LTE), and/or LTE-Advanced, and/or a wired internet network such as local area network (LAN), wide area network (WAN), Ethernet, and/or integrated services digital network (ISDN).

The apparatus 100 for servicing personalized information based on user interest may include a communication device 110, storage 120, and a processor 130.

The communication device 110 performs communication with the vehicle terminal 200. The communication device 110 receives information transmitted from the vehicle terminal 200. The communication device 110 transmits interest information to the vehicle terminal 200 according to an instruction of the processor 140.

The storage 120 may store a program for controlling an operation of the processor 130 and may temporarily store input/output data. The storage 120 may store context information for respective fields of interest in a database form. Here, the fields of interest may be classified into categories (main categories) such as restaurant, tourist spot, sunset scenes, sunrise scenes, mountains, rivers, and animals, and the categories may include detailed information (sub-categories) such as main dishes, major tourist places, scenes of specific places (e.g., sunset scene from the Taean peninsula), mountain names, river names, and animal names.

The storage 120 may store context information received via the communication device 110. The storage 120 may include a similarity matching algorithm and a clustering algorithm. Here, a Euclidean distance algorithm and/or a K-NN (nearest neighbor) algorithm may be used as the similarity matching algorithm, and a K-means clustering algorithm and/or a MIN-HASH algorithm may be used as the clustering algorithm.

The storage 120 may be implemented with at least one storage medium (recording medium) among storage media such a flash memory, a hard disk, a secure digital (SD) card, an random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, and web storage.

The processor 130 controls an overall operation of the apparatus 100 for servicing personalized information based on user interest. The processor 130 may be implemented with at least one of an application specific integrated circuit (ASIC), a digital signal processor (DSP), programmable logic devices (PLDs), field programmable gate arrays (FPGAs), a central processing unit (CPU), microcontrollers, and microprocessors.

When receiving context information transmitted from the vehicle terminal 200, the processor 130 analyzes the corresponding context information and extracts a field of interest. In this case, the processor 130 may identify the similarity between the received context information and the context information for the respective fields of interest that is stored in the storage 120, by using the similarity matching algorithm. And the processor 130 may identify or determine a field of interest (a category), based on the identified similarity. When the user's field of interest is identified or determined, the processor 130 may store the received context information as context information that matches the corresponding field of interest.

The processor 130 classifies users having the same field of interest as the same group and generates feature information of the corresponding group. In other words, the processor 130 groups users having similar fields of interest (or the same field of interest) together as one group by using the clustering algorithm.

The processor 130 generates interest information, based on the feature information of the classified group. The processor also 130 extracts contents including an unique interest (e.g., distinctive preference) common in users belonging to the same group, and generates interest information (recommended information) based on the information regarding the extracted contents.

The processor 130 may transmit the generated interest information to the vehicle terminal 200 via the communication device 110.

Figure 2:
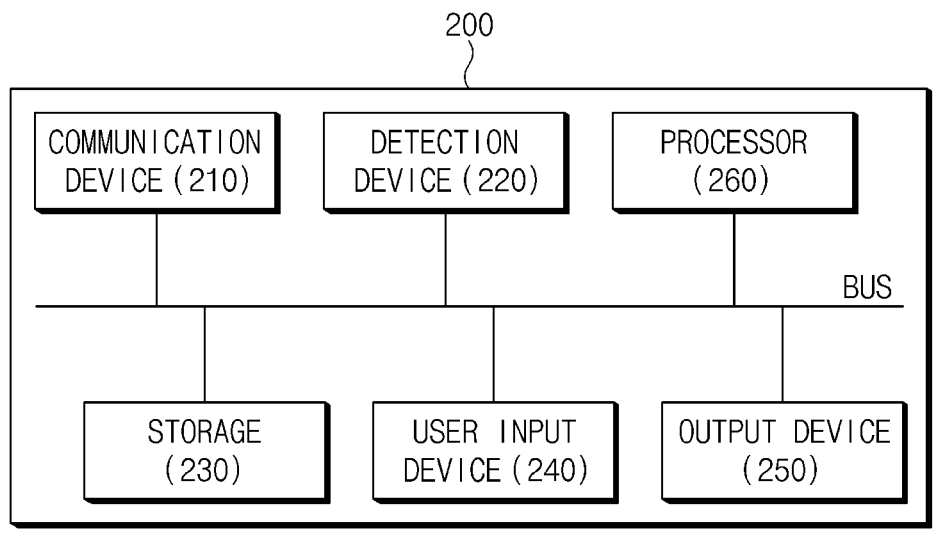
FIG. 2 is a block diagram illustrating a configuration of a vehicle terminal.

FIG. 2 is a block diagram illustrating a configuration of the vehicle terminal 200 according to one form of the present disclosure.

As illustrated in FIG. 2, the vehicle terminal 200 includes a communication device 210, a detection device 220, storage 230, a user input device 240, an output device 250, and a processor 260 that are connected with each other via a bus.

The communication device 210 performs communication with the apparatus 100 via a network. The communication device 210 may use a wireless internet technology such as telematics, WiFi, and/or Wibro, a mobile communication technology such as CDMA, GSM, LTE, and/or LTE-Advanced, and/or a vehicle to everything (V2X) technology such as vehicle to vehicle (V2V), vehicle to infrastructure (V2I), vehicle-to-nomadic devices (V2N), and/or in-vehicle network (IVN).

The detection device 220 may obtain information regarding user operation of a vehicle and context information of a user through various types of sensors and electronic control units (ECUs) mounted in the vehicle. Here, the sensors may include a speed sensor, a positioning sensor, an image sensor (a camera), and a sound sensor (e.g., a microphone). The electronic control units may include a body control unit, an engine control unit, a brake control unit, a steering control unit, and a telematics unit.

The detection device 220 may detect vehicle operation information, such as whether a window is operated, whether the vehicle departs a lane, whether the vehicle accelerates or decelerates, whether the volume on a media is adjusted, and/or whether the engine is stopped, through the sensors and the electronic control units connected thereto via the IVN. Here, the IVN is implemented with a controller area network (CAN), a media oriented systems transport (MOST) network, a local interconnect network (LIN), and/or x-by-wire (Flexray).

Furthermore, the detection device 220 may obtain context information, such as media playback information, vehicle position information, a point of interest (POI), video information, road information, a search term, time information, and a travel direction, by using the sensors and the electronic control units. The context information is information (a variable) desired for extracting (determining) the user's field of interest. The context information is related to interests.

The storage 230 may store software programmed to cause the processor 260 to perform a predetermined operation. The storage 230 may store input and output data and various pieces of setting information of the processor 260. The storage 230 may be implemented with at least one storage medium among storage media such as a flash memory, a hard disk, an SD card, a RAM, an SRAM, a ROM, a PROM, an EEPROM, an EPROM, a register, a removable disk, and web storage.

The storage 230 may store a time-of-interest determining algorithm and an eye tracking algorithm. The storage 230 may store information detected by the detection device 220.

The user input device 240 generates a control signal in response to a user operation. The user input device 240 is implemented with any one of input devices such as a button, a key, a touch pad, a keypad, and a touch screen or a combination of two or more thereof. Here, the control signal includes a signal for door locking or door unlocking, a signal for trunk open, a signal for ignition, or a signal for interrupt.

The output device 250 may output the progress state and/or the outcome according to an operation of the processor 260, in the form of visual information, auditory information, and/or tactile information. The output device 250 may include a display, an audio output module, and a tactile information output module. The display may include one or more of a liquid crystal display (LCD), a thin film transistor-liquid crystal display (TFT LCD), an organic light-emitting diode (OLED) display, a flexible display, a three-dimensional (3D) display, a transparent display, a head-up display (HUD), a touch screen, and a cluster. The audio output module may output audio data stored in the storage 230. The audio output module may include a receiver, a speaker, and/or a buzzer. The tactile information output module outputs a signal in a form that the user can recognize with the sense of touch. For example, the tactile information output module may be implemented with an oscillator and may control vibration intensity and pattern.

The processor 260 controls an overall operation of the vehicle terminal 200. The processor 260 may be implemented with at least one of an application specific integrated circuit (ASIC), a digital signal processor (DSP), programmable logic devices (PLDs), field programmable gate arrays (FPGAs), a central processing unit (CPU), microcontrollers, and microprocessors.

The processor 260 receives information regarding operation of the vehicle by the user (e.g., a driver, a passenger), and the processor 260 may determine whether an object of interest that the user shows interests is present, based on the received information regarding the operation of the vehicle by the user. The processor 260 may identify the time (the time of interest) that the user has an interest in a specific object, based on the information regarding the user operation of the vehicle.

When it is determined that the current time corresponds to the time of interest, the processor 260 collects context information through the detection device 220. The processor 260, when collecting the context information, may assign a weighing value to the collected context information, based on the information regarding the user operation of the vehicle and gaze information of the user. That is, the processor 260 may evaluate the user's interest level for the interest (e.g., a background, a POI, or the like), based on the information regarding the user operation of the vehicle and the gaze information of the user. In this case, the gaze information may be obtained by using a camera applied to a driver monitoring system.

For example, the processor 260 may assign a weight value to each piece of context information, based on Table 1 below.

TABLE 1

| Condition | Weight Value |
| --- | --- |
| gaze detection | 1 point per time (sec) during which gaze remains |
| deceleration | 1 point per 5 km/h by which the vehicle speed is reduced after detection of gaze |
| lane change | 2 points when the vehicle changes lanes toward an object of interest |
| image capture | 4 points when an image is captured |

TABLE 1-continued

| Condition | Weight Value |
| --- | --- |
| utterance (expressing an interest) (e.g., "That is stylish.", "That would be delicious.", or the like) | 4 points when an interest is expressed |
| engine stop | 3 points |
| window open | 1 point |

The processor 260 may classify the user's interest level for each piece of context information as a high level, an intermediate level, or a low level according to the total sum of weight values of the corresponding context information. The processor 260 may transmit the context information and the user's interest level for the corresponding context information to the apparatus 100 for servicing personalized information based on user interest. The processor 260 may group and store the context information according to the user's interest level. The processor 260 transmits the context information (the information relating to the object of interest) that is detected by the detection device 220, and thereafter receives interest information from the apparatus 100 for servicing personalized information based on user interest. The processor 260 outputs the received interest information through the output device 250.

Figure 3:
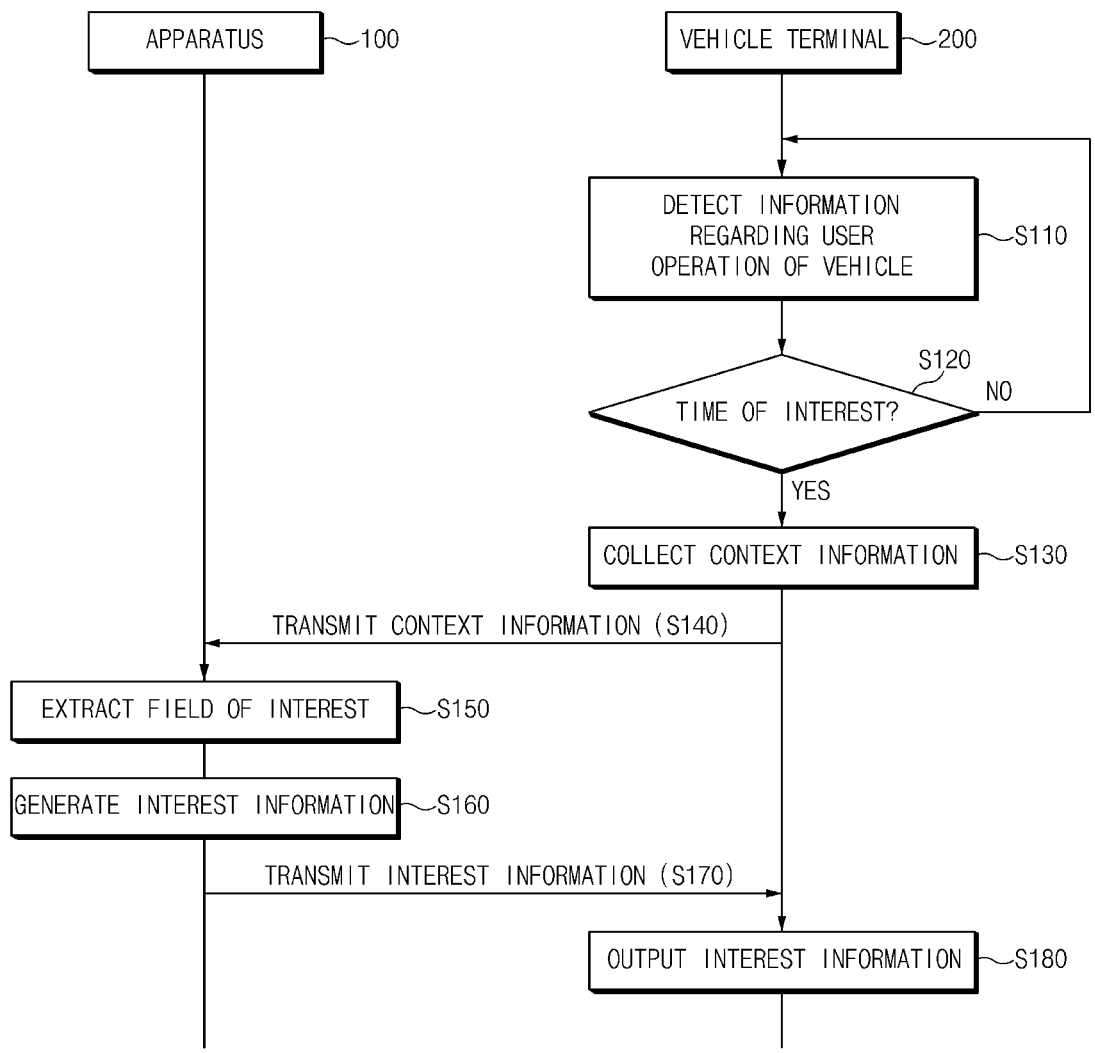
FIG. 3 is a sequence diagram illustrating a method for servicing personalized information based on user interest.

FIG. 3 is a sequence diagram illustrating a method for servicing personalized information based on user interest according to one form of the present disclosure.

The vehicle terminal 200 detects information regarding user operation of the vehicle while the vehicle is travelling (S110). The vehicle terminal 200 may obtain the information regarding the user operation of the vehicle through various types of sensors, electronic devices, and electronic control units mounted in the vehicle.

The vehicle terminal 200 determines whether the current time corresponds to time of interest, based on the information regarding the user operation of the vehicle (S120). The vehicle terminal 200 may determine whether an object of interest in which the user has an interest appears, based on the information regarding the user operation of the vehicle. For example, when a left window is opened during travel of the vehicle and the vehicle departs a lane or moves from side to side with a decrease in the accelerator pedal stroke, the vehicle terminal 200 determines that the object of interest in which the user has an interest appears to the left with respect to the travel direction of the vehicle. That is, the vehicle terminal 200 may determine the current time that the object of interest in which the user has an interest appears, as the time of interest.

When it is determined that the current time corresponds to the time of interest, the vehicle terminal 200 collects context information at the corresponding time through the detection device 220 (S130). In the case where the current time corresponds to the time of interest, the vehicle terminal 200 may obtain video information through a camera (not illustrated) that is mounted on the vehicle and may identify the position of the vehicle and the current time through a positioning sensor. Furthermore, the vehicle terminal 200 may match the position of the vehicle measured by the positioning sensor with map information stored in the storage 220 and may obtain information regarding points of interest (POIs) located within a predetermined radius, based on the name of the road on which the vehicle is travelling and the position of the vehicle. In this case, the vehicle terminal 200, when collecting the context information, may define the user's interest level (e.g., a high level, an intermediate level, or a low level) for the collected context information, based on the information regarding the user operation of the vehicle.

The vehicle terminal 200 transmits the collected context information to the apparatus 100 for servicing personalized information based on user interest (S140).

When receiving the context information from the vehicle terminal 200, the apparatus 100 for servicing personalized information based on user interest extracts a field of interest, based on the context information (S150). The apparatus 100 for servicing personalized information based on user interest compares the received context information with context information for respective fields of interest that is stored in the storage 230, by using a similarity matching algorithm and extracts a field of interest that matches the received context information. For example, when receiving information "the sunset is beautiful" as the context information through the Taean peninsula, an image of sunset, 6:00 p.m., and virtual reality (VR), the apparatus 100 for servicing personalized information based on user interest may determine the field of interest to be "sunset".

The apparatus 100 for servicing personalized information based on user interest extracts a user group having a field of interest similar to the extracted field of interest and generates interest information of the extracted user group (S160). In the case where the extracted field of interest is "sunset", the apparatus 100 for servicing personalized information based on user interest may generate a cafe or specific place to see the sunset, as interest information, based on relevant information (e.g., the position of the vehicle) in which users interested in the corresponding filed of interest have an interest.

The apparatus 100 for servicing personalized information based on user interest may transmit the generated interest information to the vehicle terminal 200 (S170). The vehicle terminal 200 may output the interest information received from the apparatus 100, to the output device 250. For example, the vehicle terminal 200 may recommend a good cafe to see the sunset that is located within a predetermined radius with respect to the position of the vehicle.

Figure 4:
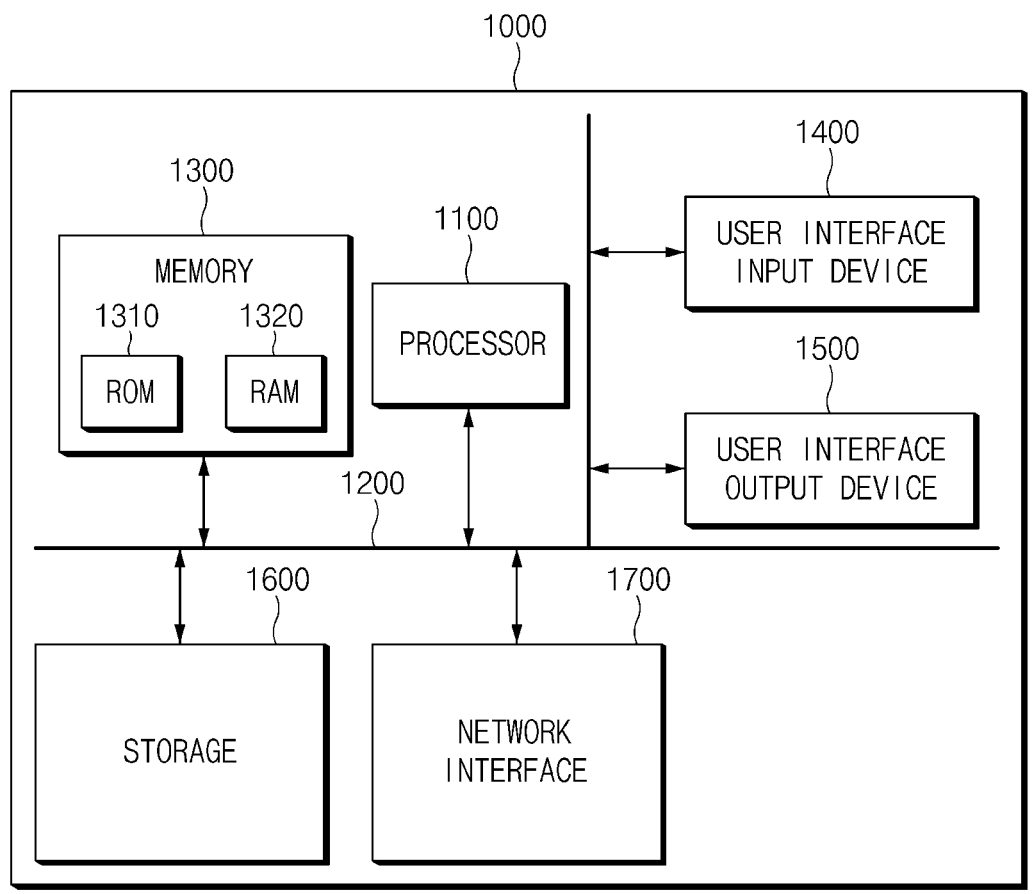
FIG. 4 is a block diagram illustrating a computing system for executing an interest information service method.

FIG. 4 is a block diagram illustrating a computing system for executing an interest information service method according to one exemplary form of the present disclosure.

Referring to FIG. 4, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, or a CD-ROM. The exemplary storage medium may be coupled to the processor 1100, and the processor 1100 may read information out of the storage medium and may record information in the storage medium.

Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the present disclosure, the apparatus and method may identify time of interest that a user has an interest in a specific object, based on information regarding user operation of a vehicle during travel of the vehicle and may generate and provide interest information at the identified time of interest, based on context information relating to the specific object.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary forms of the present disclosure are provided to explain the spirit and scope of the present disclosure, but not to limit them, so that the spirit and scope of the present disclosure is not limited by the forms.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A system for providing personalized information based on user interest, the system comprising:
    a vehicle terminal; and
    an apparatus comprising a communication device;
        a storage; and
        a processor,
    wherein the processor is configured to:
        receive context information transmitted from the vehicle terminal using the communication device,
        extract a field of interest of a user of the vehicle based on a similarity obtained by matching the received context information from the vehicle terminal and context information for the respective fields of interest of users that is stored in the storage,
        generate interest information based on feature information of a user group having same field of interest as the extracted field of interest, and
        provide the generated interest information to the vehicle terminal using the communication device,
    wherein the vehicle terminal is configured to:
        determine at least one user operation of the vehicle in response to a detection of sensors and electronic control units (ECUs) mounted in the vehicle during travel of the vehicle;
        determine whether a current time corresponds to a time of interest when the user has an interest in a specific object, based on the at least one user operation of the vehicle during the travel of the vehicle;
        when the current time corresponds to the time of interest when the user has the interest in the specific object, determine the context information relating to the specific object in response to a detection of the sensors and the ECUs at the current time; and
        output the generated interest information received from the processor to an output device, and
    wherein the at least one user operation of the vehicle includes at least one of a window operation of the vehicle, departure information of the vehicle from a lane, acceleration or deceleration information of the vehicle, volume adjustment information of a media device in the vehicle, or engine stop information of the vehicle.

2. The system of claim 1, wherein the vehicle terminal is configured to assign a weight value to each context information, based on gaze information of the user and the at least one user operation of the vehicle, and the vehicle terminal is configured to evaluate an interest level of the user for the determined context information, based on a total sum of the weight values of the context information.

3. The system of claim 2, wherein the vehicle terminal is configured to group the determined context information together, based on the interest level of the user.

4. The system of claim 1, wherein the determined context information is defined as information for extracting the field of interest of the user.

5. The system of claim 4, wherein the determined context information includes at least one of media playback information, vehicle position information, a point of interest, video information, road information, a search term, time information, or a travel direction.

6. A method for providing personalized information based on user interest, the method comprising:
    determining, by a vehicle terminal, at least one user operation of a vehicle in response to a detection of sensors and electronic control units (ECUs) mounted in the vehicle during travel of the vehicle;
    determining, by the vehicle terminal, whether a current time corresponds to a time of interest when a user of the vehicle has an interest in a specific object, based on the at least one user operation of the vehicle during the travel of the vehicle;
    when the current time corresponds to the time of interest when the user has the interest in the specific object, determining, by the vehicle terminal, context information relating to the specific object in response to a detection of the sensors and the ECUs at the current time;
    receiving, by a processor, the context information transmitted from the vehicle terminal using a communication device;
    extracting, by the processor, a field of interest of the user based on a similarity obtained by matching the received context information from the vehicle terminal and context information for respective fields of interest that is stored in a storage;
    generating interest information based on feature information of a user group having same field of interest as the extracted field of interest;
    providing, by the processor, the generated interest information to the vehicle terminal using the communication device; and
    outputting, by the vehicle terminal, the generated interest information received from the processor to an output device,
    wherein the at least one user operation of the vehicle includes at least one of window operation information of the vehicle, departure information of the vehicle from a lane, acceleration or deceleration of the vehicle, volume adjustment information of a media device in the vehicle, or engine stop information.

7. The method of claim 6, wherein receiving the context information includes:

transmitting the determined context information to an apparatus configured to provide personalized information based on user interest, by the vehicle terminal.

8. The method of claim 7,
wherein the specific object is defined as an object to which the user of the vehicle shows an interest.

9. The method of claim 7, further comprising:
assigning, by the vehicle terminal, a weight value to each context information, based on gaze information of a user of the vehicle and the at least one user operation of the vehicle; and
evaluating an interest level of the user for the determined context information, based on a total sum of the weight values of the determined context information.

10. The method of claim 9, wherein the vehicle terminal is configured to group the determined context information together, based on the interest level of the user.

11. The method of claim 7, wherein the determined context information is defined as information for extracting the field of interest of the user.

12. The method of claim 11, wherein the determined context information includes at least one of media playback information, vehicle position information, a point of interest, video information, road information, a search term, time information, or a travel direction.

* * * * *